Aug. 9, 1949.　　　　L. T. JOHNSON　　　　2,478,762
REFLECTING MICROSCOPE
Filed Dec. 28, 1945
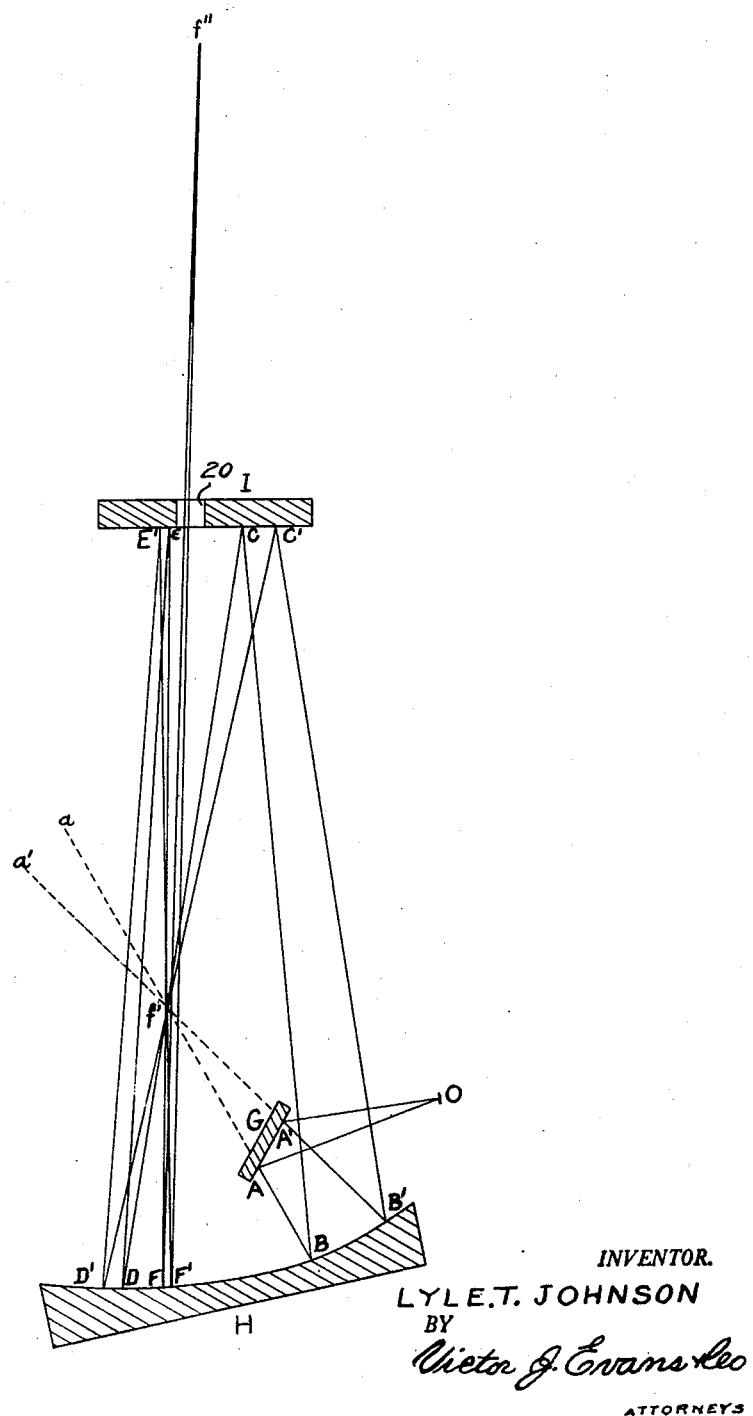
INVENTOR.
LYLE T. JOHNSON
BY
*Victor J. Evans & Co*
ATTORNEYS Patented Aug. 9, 1949

2,478,762

UNITED STATES PATENT OFFICE 2,478,762

REFLECTING MICROSCOPE

Lyle T. Johnson, La Plata, Md.

Application December 28, 1945, Serial No. 637,543

3 Claims. (Cl. 88—39)

This invention relates to microscopes and particularly to microscopes that utilize reflectors or mirrors instead of an objective lens.

The mirrors or reflectors used are coated on the front surface with aluminum or other reflecting material.

An object of this invention is to provide a microscope that is perfectly achromatic that can be used with ultra-violet light as well as visible light, thereby increasing the resolving power and making smaller objects visible.

By the use of a large mirror the resolving power is increased and the simplicity of its construction, provides a device that is easier to construct than the usual compound microscope.

The invention further resides in the features of construction, combination and arrangement hereinafter described and claimed.

For an understanding of the invention and for illustration of apparatus embodying it, reference is to be had to the accompanying drawing which illustrates diagrammatically a microscope formed with the combination of an off-axis ellipsoidal mirror in combination with straight mirrors:

The drawing illustrates an arrangement in which one off-axis ellipsoidal mirror is made to do the work of three such mirrors. The off-axis ellipsoidal mirror H having foci $f'$ and $f''$ is shown in use with plane mirrors G and I. Light from the object O is reflected at A—A' from the plane mirror G, as if it came from $f'$ at B—B', the light is reflected towards a focus at $f''$, but is intercepted at c—c' by the plane mirror I and reflected to a focus at $f'$. To accomplish this the plane mirror I must be perpendicular to the optical or major axis of an ellipse and exactly half way between $f'$ and $f''$. The light beam diverges from the focus at $f'$ to D—D' where it is again reflected towards a focus at $f''$ and is again reflected by the mirror I at E—E' to a focus at $f'$. The light diverges from $f'$ and at F—F' is reflected to the eye piece at $f''$ through an aperture 20 in the flat mirror I.

If more magnification is desired the plane mirror G may be left off and another off-axis ellipsoid used. The dotted lines a—A and a'—A', show the path of light coming from the first off-axis mirror to a focus at $f'$ and then on to the section B—B' of the mirror H.

It is to be understood that other variations may be used providing they do not extend beyond the spirit of the invention or the scope of the appended claims.

Having thus described the invention what is claimed as new and desired to be secured by Letters Patent is:

1. In a microscope, the combination, which comprises, an off-axis ellipsoidal mirror and a plurality of plane mirrors, one of said plane mirrors having an opening therethrough, said off-axis ellipsoidal mirror and the plane mirror with the opening therethrough positioned on an optical axis having first and second foci, with the first focus representing an eye piece and with the said mirror having the opening therethrough positioned midway between said first and second foci and with the optical axis passing through the opening therein, said off-axis ellipsoidal mirror positioned to intercept the optical axis at a point spaced beyond the second focus, another of said plane mirrors positioned to reflect an object from a point spaced from the optical axis to a section of said off-axis ellipsoidal mirror, from said off-axis ellipsoidal mirror to a part of the plane mirror having an opening therethrough, from the plane mirror to the off-axis ellipsoidal mirror, from the off-axis ellipsoidal mirror back to the plane mirror in a plane passing through the first focus, and back to the off-axis ellipsoidal mirror at a point aligned with the optical axis, from which the image is reflected to the eye piece.

2. In a microscope, the combination which comprises, an off-axis ellipsoidal mirror and a plurality of plane mirrors, one of said plane mirror having an opening therethrough, said off-axis ellipsoidal mirror and the plane mirror with the opening therethrough positioned on an optical axis having first and second foci, with the first focus representing an eye piece and with the said mirror having the opening therethrough positioned midway between said first and second foci and with the optical axis passing through the opening therein, said off-axis ellipsoidal mirror positioned to intercept the optical axis at a point spaced beyond the second focus, another of said plane mirrors positioned to reflect an object from a point spaced from the optical axis to a section of said off-axis ellipsoidal mirror, from said off-axis ellipsoidal mirror to a part of the plane mirror having an opening therethrough in a plane extending through the said first focus, from the plane mirror to the off-axis ellipsoidal mirror in a plane passing through the second focus, from the off-axis ellipsoidal mirror back to the plane mirror in a plane passing through the first focus, and back to the off-axis ellipsoidal mirror in a plane passing through the second focus at a point aligned with the optical axis, from which the image is reflected to the eye piece.

3. A microscope as described in claim 2, wherein the object is first reflected from the plane mirror to the ellipsoidal mirror in a plane passing through the second focus.

LYLE T. JOHNSON.

REFERENCES CITED

The following references are of record in the file of this patent:

UNITED STATES PATENTS

| Number | Name | Date |
| --- | --- | --- |
| 1,763,630 | Hopkins | June 10, 1930 |
| 2,156,911 | Brown | May 2, 1939 |
| 2,218,270 | Snook | Oct. 15, 1940 |